US006889501B2

(12) United States Patent

Busch

(10) Patent No.: US 6,889,501 B2
(45) Date of Patent: May 10, 2005

(54) HYDRAULIC SWINGING-LEAF DOOR DRIVE

(75) Inventor: Sven Busch, Dortmund (DE)

(73) Assignee: Dorma GmbH + Co. KG, Ennepetal (DE)

(*) Notice: Subject to any disclaimer, the term of this patent is extended or adjusted under 35 U.S.C. 154(b) by 70 days.

(21) Appl. No.: 10/412,842

(22) Filed: Apr. 14, 2003

(65) Prior Publication Data

US 2004/0083727 A1 May 6, 2004

(30) Foreign Application Priority Data

Apr. 16, 2002 (DE) ...................................... 102 16 982.9

(51) Int. Cl.[7] ................................................ F16D 31/02
(52) U.S. Cl. ............................................ 60/473; 60/475
(58) Field of Search ........................... 60/473, 476, 475

(56) References Cited

U.S. PATENT DOCUMENTS

| | | | | | |
|---|---|---|---|---|---|
| 1,927,580 A | * | 9/1933 | Wisner | ........................ | 60/476 |
| 2,298,542 A | | 10/1942 | Potter et al. | | |
| 3,003,317 A | | 10/1961 | Schroeder et al. | | |
| 3,083,535 A | * | 4/1963 | Krafft et al. | .................. | 60/476 |
| 5,778,671 A | * | 7/1998 | Bloomquist et al. | .......... | 60/476 |
| 6,739,130 B2 | * | 5/2004 | Prampolini | .................. | 60/476 |

* cited by examiner

*Primary Examiner*—Edward K. Look
*Assistant Examiner*—Michael Leslie
(74) *Attorney, Agent, or Firm*—Cohen, Pontani, Lieberman & Pavane

(57) ABSTRACT

A hydraulic swinging-leaf door drive for swinging doors includes an actuating piston, which acts on a drive shaft. A hydraulic pump acts on the actuating piston by way of a hydraulic circuit. The hydraulic circuit is designed as a closed circuit.

6 Claims, 1 Drawing Sheet

HYDRAULIC SWINGING-LEAF DOOR DRIVE

BACKGROUND OF THE INVENTION

1. Field of the Invention

The invention pertains to a hydraulic swinging-leaf door drive for swinging doors, the hydraulic drive including an actuating piston, acting on a drive shaft, and a hydraulic pump, connected to the actuating piston by a hydraulic circuit.

2. Description of the Prior Art

Modern hydraulic swinging-leaf door drives are driven by hydraulic units which work with a nearly constant power output. These hydraulic units usually consist of an asynchronous machine, a hydraulic pump (e.g., a gear pump), and a pressure-relief valve. The full hydraulic output, however, is used only during a very short phase of the opening cycle, whereas the excess hydraulic power in the other opening phases is carried away via the pressure-relief valve, so that, as a rule, only about ⅓ of the total hydraulic work produced is used by the swinging-leaf door drive connected to it, whereas the other ⅔ is destroyed via the pressure-relief valve, that is, converted into heat. A flow divider transmission of this type with an open hydraulic circuit containing a pressure-relief valve, however, is unsuitable for a very compact drive, because a motor of large dimensions is required, and such large motors occupy a great deal of space. In addition, because of the poor efficiency of the system, a large amount of lost heat is created, which is difficult to carry away from a compact unit, especially when it is installed under cover.

SUMMARY OF THE INVENTION

It is therefore the task of the present invention to create a hydraulic swinging-leaf door drive of the type explained above which is improved from a technical standpoint, which occupies only a small amount of space, and which is also suitable for installation under cover.

The object of the present invention is met by a hydraulic swinging-leaf door drive with an actuating piston which acts on a drive shaft, the actuating piston being driven by a hydraulic pump which is connected to the actuating piston by a closed hydraulic circuit.

The solution according to the invention offers the advantage that, because of the closed circuit design, only just enough hydraulic power is made available to satisfy the actual demand. Thus there are no losses in the hydraulic circuit. This has the result that, first, a smaller motor which occupies less space can be used, and, second, the amount of lost heat which is produced and which must be dissipated is relatively modest. Thus the swinging-leaf door drive according to the invention can be used in even very small spaces, even when installed under cover.

According to an advantageous elaboration, the speed at which the hydraulic pump is driven is variable. This makes it possible for the hydraulic power which is made available to be only just large enough to meet the actual demand, which means that less energy overall is required.

In an advantageous elaboration, the direction in which the hydraulic pump is driven can also be varied. This makes it possible to operate the hydraulic drive not only in one direction but also to allow it to run in reverse, so that as a result the door can be actively closed by means of the hydraulic pump.

A motor with variable speed and/or with variable rotational direction is preferably used as the drive for the hydraulic pump. Thus the volume flow rate of the hydraulic drive unit can be easily controlled to match the volume flow rate required by the swinging-door drive by adjusting the drive rpm's or the drive direction of the hydraulic pump.

A motor of this type is preferably designed as a DC motor or as an asynchronous motor with a frequency converter. Because of their design, these motors are especially suitable for the purpose intended here.

According to an advantageous elaboration, the suction side of the hydraulic pump is connected to a rear piston space. As a result, a closed circuit is formed, which is especially simple in design.

According to an advantageous design, the preceding measure is advantageously supported by connecting the pressure side of the hydraulic pump to a forward piston space.

When a tank space which is connected to the closed circuit is provided in the actuating piston, external leakage from the closed circuit can be quickly and easily compensated.

DETAILED DESCRIPTION OF THE PREFERRED EMBODIMENTS

Figure 1:
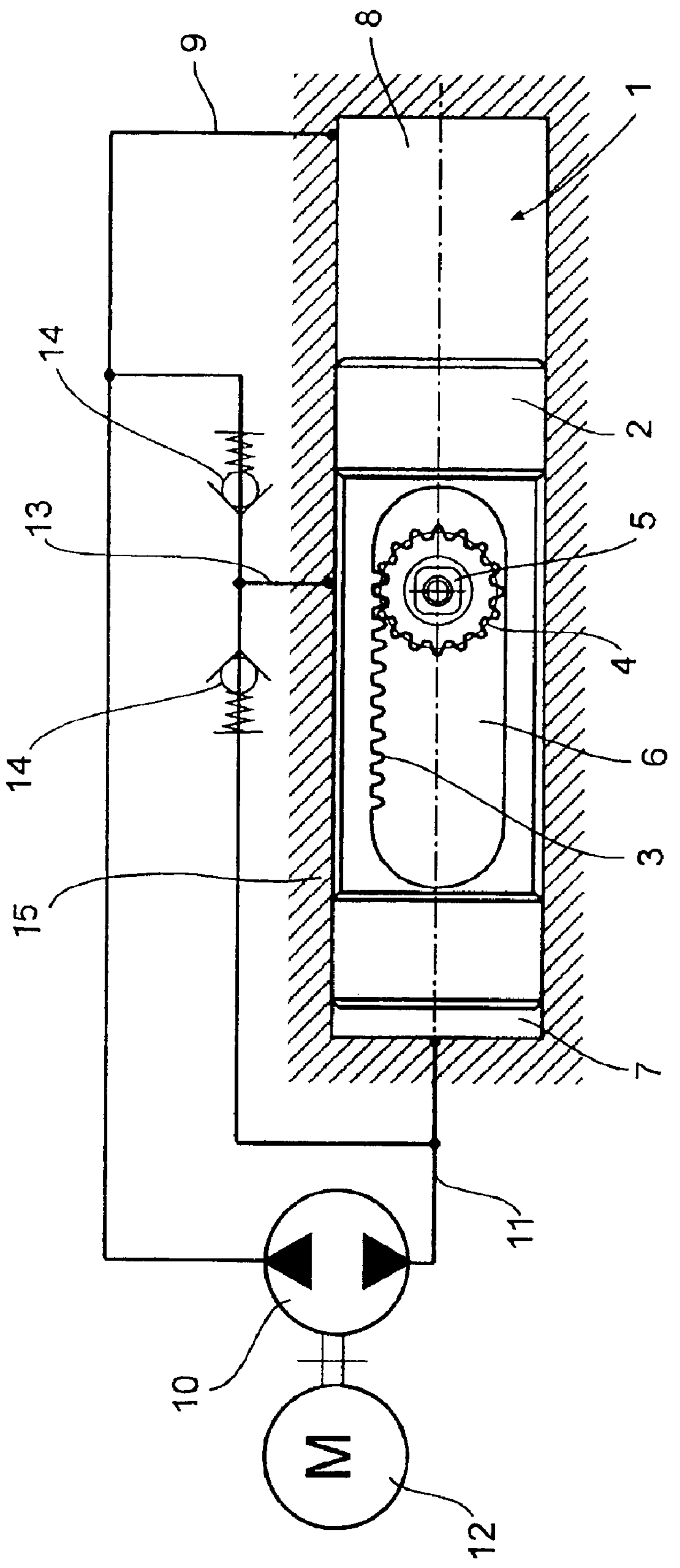
FIG. 1 is a schematic diagram of the hydraulic swinging-leaf door drive according to the present invention.

FIG. 1 shows a hydraulic swinging-leaf door drive according to the present invention. In a piston space I defined in a housing or cylinder 15, an actuating piston 2 is supported with freedom to slide back and forth. The piston 2 includes a rack 3 in working engagement with a pinion 4 connected to a drive shaft 5 of a swinging door (not shown). A tank space 6 is also provided in the actuating piston 2.

The piston space 1 includes a forward piston space 7 in front of the adjusting piston 2 (on the left in the figure) and a rear piston space 8 behind the adjusting piston 2 (on the right in the figure). The rear piston space 8 is connected by a line 9 to the suction side of a hydraulic pump 10, and the forward piston space 7 is connected by another line 11 to the pressure side of the hydraulic pump 10. A closed hydraulic circuit is thus formed.

The hydraulic pump 10 is driven by a motor 12, both the speed and direction of which can be varied, and which is preferably designed as a DC motor or as an asynchronous motor with a frequency converter. The volume flow rate of the hydraulic pump 10 can thus be adapted to the volume flow rate required by the swinging-leaf door drive by adjusting the drive speed of the motor 12 appropriately. In addition, by changing the rotational direction of the motor 12, the hydraulic pump 10 can operate in reverse and thus actively close the door connected to the swinging-leaf door drive.

To compensate for external leakage from the closed circuit, the tank space 6 in the actuating piston 2 is connected to the closed circuit by a line 13. To prevent hydraulic fluid from passing through this line 13 from the hydraulic pump 10 to the tank space 6, at least one, preferably two, nonreturn valves 14 are provided in the line 14.

In a similar way, it is also possible to design a swinging-leaf door drive to serve as a swing drive for a door closer in which the power is transmitted via a rack or a cam mechanism and in which the opening of the door puts a spring under tension. The only point to be remembered here is that the individual pressure spaces of the door closer, namely, the forward and the rear piston spaces and the tank space, are connected by various nonreturn and throttle valves, which means that, when the system is driven with a closed circuit, additional switching valves will be required. This does not, however, affect the basic principle of a closed hydraulic circuit.

The preceding description of the exemplary embodiment of the present invention serves only to illustrate the invention, not to limit it. Within the scope of the invention, various changes and modifications are possible without abandoning the scope of the invention or of its equivalents.

What is claimed is:

1. A hydraulic swinging-leaf door drive for swinging doors, comprising:

an actuating piston movably arranged in a piston space defined by a cylinder and connectable for acting on a drive shaft of a swinging door, said piston dividing said piston space into a rear-piston space and a front space on opposing sides of said piston;

a hydraulic circuit connected to said actuating piston;

a hydraulic pump connected to said hydraulic circuit for acting on said actuating piston through said hydraulic circuit, a suction side of said hydraulic pump being connected to said rear piston space and a pressure side of said hydraulic pump being connected to the front piston space, wherein hydraulic circuit is a closed circuit, said piston defining a tank space therein, said tank space being connected to said closed hydraulic circuit by a connecting line.

2. The hydraulic swinging-leaf door drive of claim 1, wherein said hydraulic pump is a variable speed driven pump.

3. The hydraulic swinging-leaf door drive of claim 1, wherein said hydraulic pump is driven in a variable direction.

4. The hydraulic swinging-leaf door drive of claim 1, wherein said hydraulic pump includes an electric motor for driving the hydraulic pump in a variable direction and speed.

5. The hydraulic swinging-leaf door drive of claim 4, wherein said electric motor comprises one of a DC motor and an asynchronous motor with a frequency converter.

6. The hydraulic swinging-leaf drive of claim 1, further comprising at least one non-return valve in said connecting line.

* * * * *